Patented Dec. 21, 1937

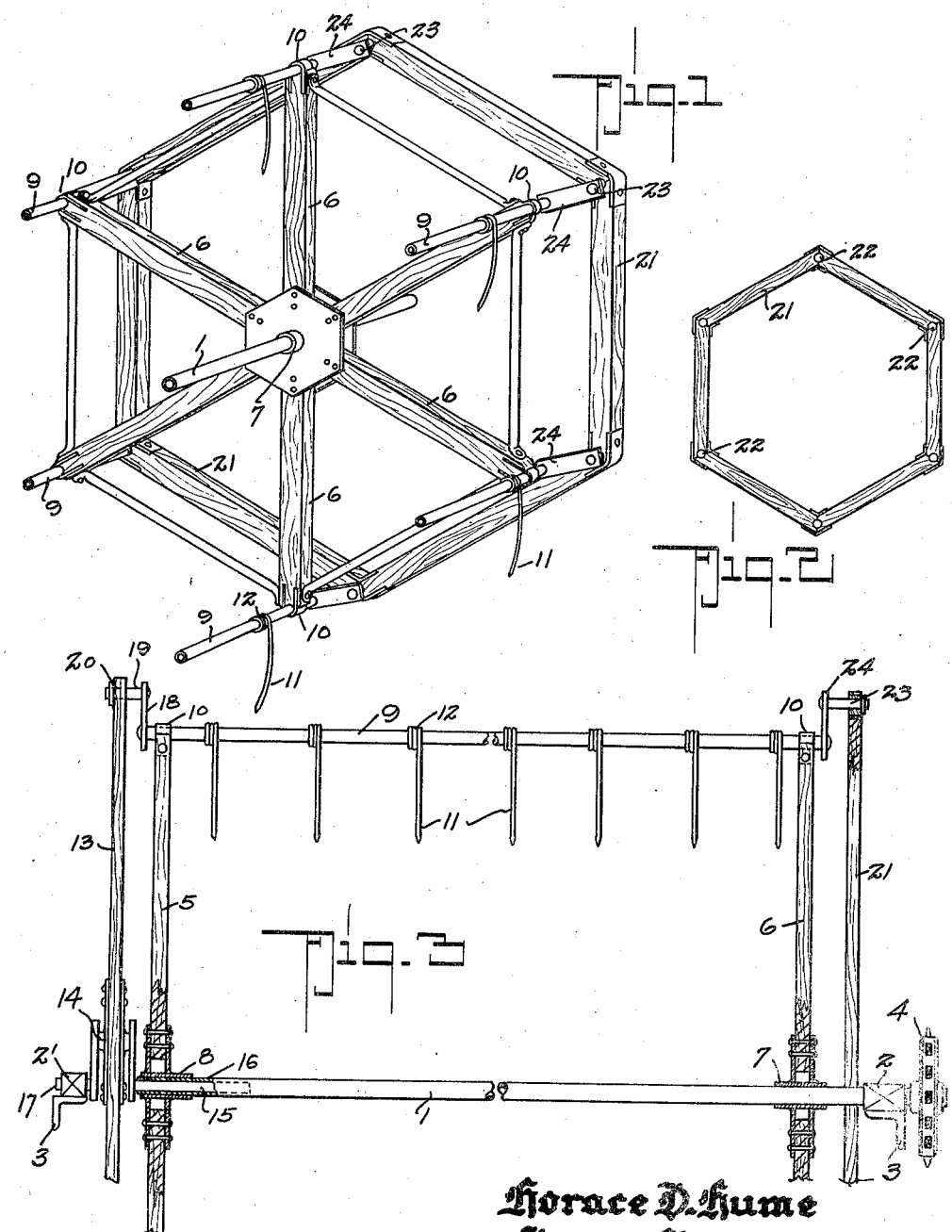

2,102,709

UNITED STATES PATENT OFFICE 2,102,709

HARVESTER REEL

Horace D. Hume and James E. Love, Garfield, Wash., assignors to Hume-Love Company, Garfield, Wash., a corporation Application November 18, 1935, Serial No. 50,388

4 Claims. (Cl. 56—220)

Our present invention relates to improvements in harvester reels of the type disclosed in our allowed application for patent Serial No. 4,830 filed February 4, 1935 and which has matured into Patent No. 2,024,735, granted December 17, 1935.

In this type of reels, which are employed with harvesters of the sickle or reciprocating cutter type, the tine bars while rotating as a part of the reel, also have a rotary movement in relation to and independent of the reel, for the purpose of maintaining the tines, in all stages of their rotary movement with the reel, in upright or perpendicular position. The tines are thus made to approach the vines or grain to be harvested in proper working position for effectively gathering and presenting the crop to the sickle or reciprocating cutter.

When a heavy growth of thick vines, or a mass of fallen or down grain, is encountered by the rotating tines of the reel, we find that the tines and the tine bars are subjected to strains that frequently twist the tine bars, and the resistance of the heavy growth of vines, or of fallen grain, results in displacing the tines, thus decreasing the efficiency of the reel.

To overcome these difficulties, and further improve the reel, we have combined therewith, and with the rotary, eccentric operating frame of the tine bars, an auxiliary frame or brace member, which in addition to overcoming the resistance offered by the vines and grain to be harvested, stabilizes the independent rotary movement of the tine bars, and also forms a counterbalance for the reel.

Our invention consists in certain novel combinations and arrangements of parts as will hereinafter be more fully set forth and claimed. In the accompanying drawing we have illustrated one complete example of the physical embodiment of our invention, in which the parts are combined and arranged according to one mode we have thus far devised for the practical application of our invention.

Figure 1 is a perspective view at one end of a reel equipped with the improvements of our invention.

Figure 2 is a view in side elevation, reduced scale, showing the auxiliary stabilizing frame.

Figure 3 is a longitudinal sectional detail view of part of the reel, showing also the reel-mount and driving means.

In order that the general arrangement and relation of parts may readily be understood, we have shown in Figure 3 a portion of a reel having the longitudinal shaft 1 supported in journal bearings 2 and 2' on the frame members 3 of the implement, and a chain and sprocket are indicated at 4 for revolving the reel on its journals.

The reel includes two spaced spider heads 5 and 6 having axially alined bushings or collars 7 and 8 fixed to the shaft so that the reel revolves with the shaft. Six tine bars 9 are illustrated as extending parallel with the shaft and these bars, at their ends are journaled in bearings 10 of the reel-heads, in order that the bars may have a rotary movement independent of the reel, as well as revolving with the reel.

The tine bars are equipped with tines 11 spaced at equidistant intervals, and the tines, which are fashioned of resilient metal, are attached to the bars by coiled spring fasteners as 12, and maintained at all times in position substantially perpendicular to the ground surface for most efficient working position.

The tine bars are turned in their bearings by the action of an eccentrically supported operating frame 13, of hexagonal shape and conforming to the shape of the spider heads, which frame is supported exterior of one end of the reel with its axis 14 offset from the shaft 1. The operating frame is axially supported on a U-shaped crank shaft, which shaft has one journal end 15 axially alined with and supported in the tubular end 16 of the main shaft 1, and the other alined journal end 17 of the crank shaft is supported to turn in the bearing 2'.

As will be seen in Figure 1 the ends of the tine bars project outwardly through their bearings 10, and at one end of the reel these projecting ends have fixed thereto crank arms 18, which are provided with fixed pins 19, and the pins are journaled at 20 in the eccentric operating frame. By this means, the auxiliary rotary movement of the tine bars is imparted thereto as the reel bodily revolves about its axis.

Under conditions as heretofore explained the ends of the tine bars remote from the operating frame 13 are frequently twisted and the tines are displaced and lag behind the tines located nearer to the operating frame. To correct this defect, we mount an auxiliary frame 21 at the end of the reel remote from the end having the operating frame, and this auxiliary frame which is also hexagonal is located exterior of the reel.

The auxiliary frame has six journal bearings 22 that are mounted on the projecting ends of journal pins 23 that extend laterally from crank arms 24 fixed on the projecting ends of the tine bars.

The auxiliary frame, which partakes of the rotary movement with the reel, also revolves with the eccentric operating frame at the opposite end of the reel. The auxiliary frame lends rigidity to the revolving reel as a whole, and in coaction with the operating frame, these two frames stabilize the auxiliary rotary movement of the tine bars, maintaining them against twisting, and at the same time holding the tines against displacement when the tines encounter resistance from the crop to be harvested. By thus maintaining the working tines on a tine bar in alinement, the crop is gathered uniformly and evenly presented to the cutter, and harvesting of the crop is accomplished without substantial waste.

Having thus fully described our invention, what we claim and desire to secure by Letters Patent is:—

1. The combination with a rotary reel of polygonal shape in cross section and its longitudinally extending tine bars having a supplemental rotary movement, of an exterior, eccentric operating frame for said bars conforming to the shape of the reel and mounted at one end of the reel, power transmission means connecting said frame and bars, and an exterior, complementary stabilizing frame mounted on said bars at the other end of the reel.

2. The combination with a rotary reel of polygonal shape in cross section and its longitudinally extending tine bars having a supplemental rotary movement, of means for rotating said bars, an exterior stabilizing frame conforming to the shape of the reel and mounted at one end thereof, and power transmission connections between said frame and the bars whereby the frame partakes of the supplemental rotary movement of the bars.

3. The combination with a rotary reel of polygonal shape in cross section and its longitudinally extending tine bars having a supplemental rotary movement, of operating means for rotating the bars, a reel-shaft and means co-acting therewith to actuate the operating means, crank arms fastened to said bars at one end of the reel and crank pins on said arms, and an auxiliary stabilizing frame conforming to the shape of the reel and having bearings mounted on said pins.

4. The combination with a rotary reel of polygonal shape in cross section including longitudinally extending tine bars having a supplementary rotary movement, and crank arms mounted on each of the opposite ends of said bars, of an exterior eccentric operating frame conforming to the shape of the reel and mounted at one end thereof, pins on said bars having journal bearings in said frame, an exterior stabilizing frame at the other end of the reel having journal bearings, journal pins on said bars supported in said bearings, a reel shaft, and means co-acting therewith to actuate the operating frame.

HORACE D. HUME.
JAMES E. LOVE.